(12) United States Patent
Ayres et al.

(10) Patent No.: US 10,353,151 B2
(45) Date of Patent: Jul. 16, 2019

(54) POLARIZATION MANAGEMENT

(71) Applicant: Akonia Holographics LLC, Longmont, CO (US)

(72) Inventors: Mark R. Ayres, Boulder, CO (US); Friso Schlottau, Lyons, CO (US); Adam Urness, Louisville, CO (US); Kenneth E. Anderson, Longmont, CO (US)

(73) Assignee: Akonia Holographics, LLC, Longmont, CA (US)

( * ) Notice: Subject to any disclaimer, the term of this patent is extended or adjusted under 35 U.S.C. 154(b) by 0 days.

(21) Appl. No.: 15/628,595

(22) Filed: Jun. 20, 2017

(65) Prior Publication Data

US 2017/0363811 A1      Dec. 21, 2017

Related U.S. Application Data

(60) Provisional application No. 62/352,498, filed on Jun. 20, 2016, provisional application No. 62/452,262, filed on Jan. 30, 2017.

(51) Int. Cl.
*G02B 6/00* (2006.01)
*G02B 6/27* (2006.01)
*G02B 27/01* (2006.01)

(52) U.S. Cl.
CPC ......... *G02B 6/2726* (2013.01); *G02B 6/2773* (2013.01); *G02B 27/0172* (2013.01); *G02B 2027/0174* (2013.01)

(58) Field of Classification Search
USPC ..................................... 385/11, 140
See application file for complete search history.

(56) References Cited

U.S. PATENT DOCUMENTS 7,162,136 B1 *   1/2007   Pertl ................ G01J 1/04
                                                    385/11
9,207,461 B2 *  12/2015   Frankel ............ G02B 27/286

* cited by examiner

*Primary Examiner* — Eric Wong
(74) *Attorney, Agent, or Firm* — Michael H. Lyons

(57) ABSTRACT

An optical device for polarizing light including a polarization altering element operatively coupled to a light path associated with the first light coupling device and the second light coupling device is described. The optical device may further include a first waveguide portion including a first layer having parallel plane surfaces with the first waveguide portion having a first light coupling device. The optical device may also include a second waveguide portion including a second layer having parallel plane surfaces with the second waveguide portion having a second light coupling device.

20 Claims, 13 Drawing Sheets

900

POLARIZATION MANAGEMENT

CROSS-REFERENCE TO RELATED PATENT APPLICATIONS

This application claims priority from U.S. Application Nos. 62/352,498, filed 20 Jun. 2016 and titled "SKEW MIRROR POLARIZATION MANAGEMENT," 62/452,262, filed 30 Jan. 2017 and titled "SKEW MIRROR POLARIZATION MANAGEMENT." The above applications are incorporated herein by reference for all purposes, in their entireties.

FIELD OF TECHNOLOGY

The present disclosure relates generally to optical reflective devices, and more specifically to polarization management of light within optical reflective devices.

BACKGROUND

Conventional grating structures can reflect light about a reflective axis that differs from surface normal of the medium in which the grating structure resides. However, for a given angle of incidence, angles of reflection for conventional grating structures typically covary with wavelength of incident light. Moreover, a conventional grating structure is typically limited to a single angle of incidence (or very narrow range of incidence angles), in order to reflect light of a specified wavelength about a constant reflective axis. Conventional grating structures may also diffract light of some polarization states more strongly than others, and some polarization states may not be diffracted at all. In some optical systems, light sources generate light with randomized polarizations. In these systems, conventional grating structures may waste much of the light and, therefore, may not be efficient in many beam redirection or light coupling applications.

Accordingly, requirements for an optical device including at least one light coupling element that manages the polarization of light to efficiently reflect light about a reflective axis not constrained to surface normal, and whose angle of reflection for a given angle of incidence is constant across a range of incidence angles, are not met by currently available devices comprising reflective grating structures. A need therefore exists for such an optical device that manages polarization of light and interactions of reflected light with one or more grating structures, and such need may be acute in head-mounted display (HMD) devices.

SUMMARY

In one embodiment, an optical device may include a first waveguide portion including a first layer having parallel plane surfaces, the first waveguide portion having a first light coupling device, a second waveguide portion including a second layer having parallel plane surfaces, the second waveguide portion having a second light coupling device, and a polarization altering element operatively coupled to a light path associated with the first light coupling device and the second light coupling device.

In some examples of the optical device described above, the polarization altering element is positioned between the first layer and the second layer. Some examples of the optical device described above may also include a third layer having parallel plane surfaces, the third layer positioned such that a surface of the parallel plane surfaces of the third layer contacts both a surface of the parallel plane surfaces of the first layer and a surface of the parallel plane surfaces of the second layer.

In some examples of the optical device described above, the polarization altering element may be positioned such that a surface of the polarization altering element contacts both an edge of the first layer and an edge of the second layer. In some examples, the edge of the first layer may be perpendicular to the parallel plane surfaces of the first layer.

Some examples described above may also include a third light coupling device positioned to contact a surface of the polarization altering element different from the surface of the polarization altering element that contacts both the edge of the first layer and the edge of the second layer.

In some examples of the optical device described above, the polarization altering element may be positioned such that a surface of the polarization altering element contacts a surface of the first waveguide portion and an opposing surface of the polarization altering element contacts a surface of the second waveguide portion.

In some examples of the optical device described above, the polarization altering element may be a half-wave plate. In some examples of the optical device described above, the polarization altering element includes a light absorbing edge.

In some examples of the optical device described above, the first light coupling device comprises a first grating medium, a first grating structure within the first grating medium. In some examples, the first grating structure may be configured to reflect total internal reflection (TIR) light of a wavelength about a first reflective axis such that the reflected TIR light propagates as TIR light within the first waveguide portion. In some examples, the first grating structure may be configured to reflect light of a wavelength about a first reflective axis offset from a surface normal of the parallel plane surfaces of the first layer (e.g., oriented on a plane parallel to the parallel plane surfaces of the first layer in some implementations) at a first incidence angle. A second grating structure may also be included within the first grating medium, the second grating structure being configured to reflect light of the wavelength about a second reflective axis substantially parallel to the first reflective axis at a second incidence angle different from the first incidence angle.

Some examples of the optical device described above may also include at least one of the first grating structure or the second grating structure comprises a hologram. Some examples of the optical device described above may also include at least one of the first grating structure or the second grating structure comprises a non-holographic diffractive optical element.

In some examples of the optical device described above, the second light coupling device comprises a second grating medium, a first grating structure within the second grating medium, the first grating structure being configured to reflect light of a wavelength about a first reflective axis offset from a surface normal of the second waveguide portion at a first incidence angle. Some examples of the optical device or system described above may also include a second grating structure within the second grating medium, the second grating structure being configured to reflect light of the wavelength about a second reflective axis offset from the surface normal of the second waveguide portion at a second incidence angle different from the first incidence angle. In some examples described above, the first reflective axis may be substantially similar to the second reflective axis.

In one embodiment, an optical device may include a waveguide including a first layer having parallel plane surfaces and a second layer having parallel plane surfaces, a first polarization altering element positioned between the first layer and the second layer, and a first light coupling device disposed within the second layer.

Some examples of the optical device or system described above may also include a second polarization altering element positioned on a surface of the first layer that may be opposite of a surface of the first layer that contacts the first polarization altering element. Some examples of the optical device or system described above may also include a second light coupling device disposed within the second layer, the second light coupling device having a second reflective axis different from a first reflective axis of the first light coupling device. Some examples of the optical device or system described above may also include a third polarization altering element disposed within the second layer.

In some examples of the optical device described above, the first light coupling device comprises a first grating medium, a first grating structure within the first grating medium, the first grating structure being configured to reflect light of a wavelength about a first reflective axis oriented on a plane parallel to the parallel plane surfaces of the first layer at a first incidence angle. Some examples of the optical device or system described above may also include a second grating structure within the first grating medium, the second grating structure being configured to reflect light of the wavelength about a second reflective axis substantially parallel to the first reflective axis at a second incidence angle different from the first incidence angle. Some examples described above may also include at least one of the first grating structure or the second grating structure that comprises a hologram.

In one embodiment, an optical device may include a first waveguide portion including a first layer having parallel plane surfaces, a second waveguide portion including a second layer having parallel plane surfaces, and a polarization altering element operatively coupled to a light path associated with the first waveguide portion and the second waveguide portion.

In some examples of the optical device described above, the first waveguide portion may or may not include a light coupling element and the second waveguide portion may or may not include a light coupling element.

A method of making an optical device is described. The method may include injecting media into a first cavity of a mold structure, writing one or more holograms within the media, injecting media into a second cavity of the mold structure, and writing one or more holograms within the media in the second cavity, wherein a polarization altering element is positioned between the first cavity and the second cavity of the mold structure.

An apparatus for making an optical device is described. The apparatus may include means for injecting media into a first cavity of a mold structure, means for writing one or more holograms within the media, means for injecting media into a second cavity of the mold structure, and means for writing one or more holograms within the media in the second cavity, wherein a polarization altering element is positioned between the first cavity and the second cavity of the mold structure.

A method of making an optical device is described. The method may include applying birefringent material to a substrate to form a polarization altering substrate, and forming a waveguide including a media layer and the polarization altering substrate. The method may include applying a photopolymer to the media layer to form a polarization altering media layer.

An apparatus for making an optical device is described. The apparatus may include means for applying birefringent material to a substrate to form a polarization altering substrate, and means for forming a waveguide including a media layer and the polarization altering substrate. The apparatus may include means for applying a photopolymer to the media layer to form a polarization altering media layer

Figure 1:
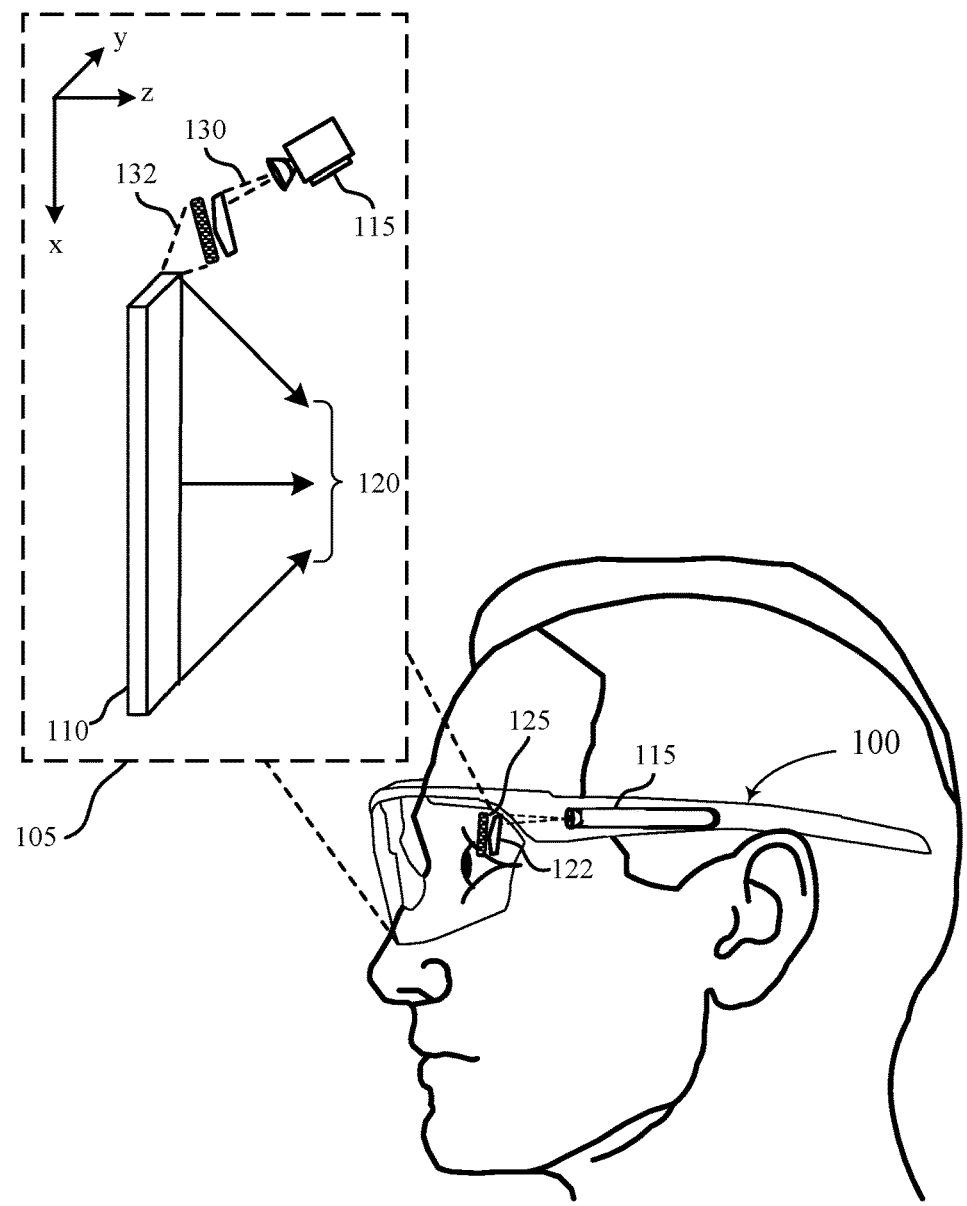
FIG. 1 is an illustration of an HMD device in which the principles included herein may be implemented.

A further understanding of the nature and advantages of implementations of the present disclosure may be realized by reference to the following drawings. In the appended figures, similar components or features may have the same reference label. Further, various components of the same type may be distinguished by following the reference label by a dash and a second label that distinguishes among the similar components. If only the first reference label is used in the specification, the description is applicable to any one of the similar components having the same first reference label irrespective of the second reference label.

DETAILED DESCRIPTION

Optical waveguides have a physical structure that guides electromagnetic waves in the optical spectrum (e.g., light). In some cases, an optical waveguide can be an optical fiber or a substantially planar waveguide structure. An optical waveguide can use total internal reflection (TIR) to guide light to an output. Light may be polarized with an electric field component parallel to the normal of the plane of incidence (e.g., p-polarized). Light may also be polarized with an electric field perpendicular to the normal of the plane of incidence (e.g., s-polarized). Depending on the polarization of the light, light propagation through components of an optical waveguide may vary. Thus, an area of an optical waveguide may not receive the light being guided due to the polarization of the light. In some cases, the polarization of light propagated through a waveguide can result in performance deficits for certain TIR device applications. Accordingly, it may be beneficial to alter the polarization of light for a particular area of an optical waveguide or TIR device.

A holographic optical element using volumetric diffraction may produce reflected light that is polarized. For example, light may enter a waveguide, propagate through the waveguide including one or more holographic optical elements, and reflect towards an exit pupil. The one or more holographic optical elements may include a cross coupler and an output coupler. Depending on the waveguide geometry, the light that enters the waveguide may not propagate and reflect in consecutive 90° angles without changing the polarization of the light. For example, light that is p-polarized may propagate down the waveguide and participate in the diffraction/reflection process by a cross coupler. As the light is diffracted to the output coupler, the light may need to be changed from p-polarization to s-polarization in order for the light to be diffracted strongly by the output coupler.

One or more holographic optical elements may be used in a waveguide of an HMD device. An HMD device is a wearable device that has the capability of reflecting projected images as well as allowing a user to experience augmented reality. HMD devices typically involve near-eye optics to create "virtual" images. In the past, HMD devices have dealt with a variety of technical limitations that reduced image quality and increased weight and size. Past implementations have included conventional optics (e.g., conventional diffraction grating structures and mirrors) to reflect, refract or diffract light, however, the designs tend to be bulky. Additionally, conventional grating structures and mirrors have inherent limitations.

For example, a conventional mirror may have a reflective axis that is necessarily coincident with surface normal. The reflective axis of a conventional mirror may lead to suboptimal orientation or performance of the mirror. Also, conventional grating structures may include multiple reflective axes that covary unacceptably with incidence angle and/or wavelength. In some cases, light with randomized polarizations may interact with some of the multiple reflective axes of conventional grating structures such that managing the polarization of light for these conventional grating structures is unnecessary in certain applications. In other applications such as beam redirection or light coupling applications, certain types of conventional grating structures may indeed benefit from the light polarization management techniques described herein.

In some examples of the subject technology, the polarization of light may be changed (e.g., rotated 90°) via of a polarization altering element within the waveguide. For example, a birefringent or optically active material may be used as the substrate or as the holographic material itself. In some cases, a wave plate may be implemented between the cross coupler and the output coupler (e.g., a half-wave plate) to rotate the polarization of light as it travels down the waveguide, diffracts towards the output coupler, and diffracts towards the exit pupil. The intensity of the reflected light may be dependent on both the polarization and the angle for p-polarization.

This description provides examples, and is not intended to limit the scope, applicability or configuration of implementations of the principles described herein. Rather, the ensuing description will provide those skilled in the art with an enabling description for implementing implementations of the principles described herein. Various changes may be made in the function and arrangement of elements.

Thus, various implementations may omit, substitute, or add various procedures or components as appropriate. For instance, it should be appreciated that the methods may be performed in an order different than that described, and that various steps may be added, omitted or combined. Also, aspects and elements described with respect to certain implementations may be combined in various other implementations. It should also be appreciated that the following systems, methods, devices, and software may individually or collectively be components of a larger system, wherein other procedures may take precedence over or otherwise modify their application.

FIG. 1 is an illustration of an HMD device 100 in which the principles included herein may be implemented. The HMD 100 may include eyewear or headwear in which a near-eye display (NED) 105 may be affixed in front of a user's eyes. The NED 105 may include a diffractive element portion disposed within or incorporated with a lens assembly of the HMD 100. In some examples, the diffractive element portion is a holographic optical element (HOE), which may be comprised of a skew mirror 110. Coordinates (x, y, and z-axis) are provided with reference to the skew mirror 110. The HMD 100 may include a light source or light projector 115 operatively coupled to the lens assembly. In some examples light source or light projector 115 may be operatively coupled to the lens assembly in a waveguide configuration. In some examples light source or light projector 115 may be operatively coupled to the lens assembly in a free space configuration.

The skew mirror 110 is a reflective device which may include a grating medium within which resides a volume hologram or other grating structure. The skew mirror 110 may be configured as an output coupler in the such that the skew mirror 110 reflects TIR light so that the reflected light becomes non-TIR. The skew mirror 110 may include an additional layer such as a glass cover or glass substrate. The additional layer may serve to protect the grating medium from contamination, moisture, oxygen, reactive chemical species, damage, and the like. The additional layer may also be refractive index matched with the grating medium. The grating medium, by virtue of the grating structure residing therein, has physical properties that allow it to diffract light about an axis, referred to as a reflective axis, wherein angle of diffraction (henceforth referred to as angle of reflection) varies by less than 1° for multiple wavelengths of light incident upon the grating medium at a given angle of incidence. In some cases, the reflective axis is also constant for multiple wavelengths and/or angles of incidence. In some cases, the grating structure is formed by one or more holograms. The one or more holograms can be volume-phase holograms in some implementations. Other types of holograms may also be used in various implementations of the grating structure.

Similarly, implementations typically have substantially constant reflective axes (i.e., reflective axes have reflective axis angles that vary by less than 1°) across a range of incidence angles for incident light of a given wavelength, and this phenomenon may be observed with incident light at various wavelengths. In some implementations, the reflective axes remain substantially constant for every combination of a set of multiple incidence angles and a set of multiple wavelengths.

A hologram may be a recording of an interference pattern, and may include both intensity and phase information from the light used for the recording. This information may be recorded in a photosensitive medium that converts the interference pattern into an optical element that modifies the amplitude or the phase of subsequent incident light beams according to the intensity of the initial interference pattern. The grating medium may include a photopolymer, photorefractive crystals, dichromated gelatin, photo-thermo-refractive glass, film containing dispersed silver halide particles, or other material with the ability to react to and record an incident interference pattern. In some cases, coherent laser light may be used for recording and/or reading the recorded hologram.

In some cases, a hologram may be recorded using two laser beams known as recording beams. In some cases, the recording beams may be monochromatic collimated plane wave beams that are similar to each other except for angles at which they are incident upon the grating medium. In some implementations, the recording beams may have amplitude or phase distributions that differ from each other. The recording beams may be directed so that they intersect within the recording medium. Where the recording beams intersect, they interact with the recording medium in a way that varies according to the intensity of each point of the interference pattern. This creates a pattern of varying optical properties within the recording medium. For example, in some embodiments, a refractive index may vary within the recording medium. In some cases, the resulting interference pattern may be spatially distributed (e.g., with a mask or the like) in a manner that is uniform for all such grating structures recorded on the grating medium. In some cases, multiple grating structures may be superimposed within a single recording medium by varying the wavelength or the angle of incidence to create different interference patterns within the recording medium. In some cases, after one or more holograms are recorded in the medium, the medium may be treated with light in a post-recording light treatment. The post-recording light treatment may be performed with highly incoherent light to substantially consume remaining reactive medium components such as photoinitiator or photoactive monomer, such that photosensitivity of the recording medium is greatly reduced or eliminated. After recording of holograms or other grating structures in a recording medium has been completed, the medium is typically referred to as a grating medium. Grating mediums have typically been rendered non-photosensitive In some implementations, the grating structure includes a hologram generated by interference between multiple light beams referred to as recording beams. Typically, but not necessarily, the grating structure includes multiple holograms. The multiple holograms may be recorded using recording beams incident upon the grating medium at angles that vary among the multiple holograms (i.e., angle multiplexed), and/or using recording beams whose wavelengths vary among the multiple holograms (i.e., wavelength multiplexed), and/or using recording beams whose positions vary among the multiple holograms (i.e., spatially multiplexed). In some implementations, the grating structure includes a hologram recorded using two recording beams whose angles of incidence upon the grating medium vary while the hologram is being recorded, and/or whose wavelengths vary while the hologram is being recorded. Implementations further include a device wherein the reflective axis differs from surface normal of the grating medium by at least 1.0 degree; or at least by 2.0 degrees; or at least by 4.0 degrees; or at least by 9.0 degrees.

Light projector 115 may provide image-bearing light to the lens assembly. Incident light 130 of the image-bearing light may be provided to a light coupling device (e.g., a cross coupler) 122 of the lens assembly. The light coupling device 122 may be a skew mirror or use skew mirror technology like skew mirror 110. The light coupling device 122 may reflect the incident light 130 so that it the light remains in a TIR mode. A polarization altering element 122 may alter the polarization of TIR light 132 in an optical path from the light coupling device 122 to the skew mirror 110. In some examples, the lens assembly and skew mirror 110 may be substantially flat with respect to the x-y plane; however the lens assembly may include some curvature with respect to the x-y plane in certain implementations. Reflected light 120 from skew mirror 110 may be reflected towards an eye box situated at a fixed distance along the z-axis away from skew mirror 110. In some examples, skew mirror 110 may be contained at least partially within a waveguide. The waveguide may propagate incident light 130 by total internal reflection towards the skew mirror 110. In some examples, incident light 130 may propagate by free space towards skew mirror 110. The skew mirror 110 may include a grating medium made of a photopolymer. The skew mirror 110 may also include one or more grating structures within the grating medium. Each grating structure may include one or more sinusoidal volume gratings which may overlap with each other. A grating structure may be configured to reflect light of a particular wavelength about a reflective axis offset from a surface normal of the grating medium at a particular plurality of incidence angles. Each grating structure within the grating medium may be configured to reflect a portion of light toward an exit pupil in the eye box at a fixed distance from the waveguide.

Each grating structure may reflect light in a manner different from another grating structure. For example, a first grating structure may reflect incident light of a first wavelength at a first incidence angle, whereas a second grating structure may reflect incident light of a second wavelength at the first incidence angle (e.g., different grating structures may be configured to reflect different wavelengths of light for incident light of the same incidence angle). Also, a first grating structure may reflect incident light of a first wavelength at a first incidence angle, whereas a second grating structure may reflect incident light of the first wavelength at a second incidence angle (e.g., different grating structures may be configured to reflect the same wavelength of light for incident light of different incidence angles). Furthermore, a grating structure may reflect first incident light of a first wavelength and first incidence angle, and the grating structure may reflect second incident light at a second wavelength and second incidence angle about the same reflective axis. In this manner, different grating structures can be used to selectively reflect a particular wavelength of light for incident light at a range of incidence angles. These different grating structures may be super-imposed within the grating medium of the skew mirror 110. The skew mirror 110 may have a substantially constant reflective axis (i.e., each grating structure of the skew mirror 110 has a same substantially constant reflective axis).

Figure 2A:
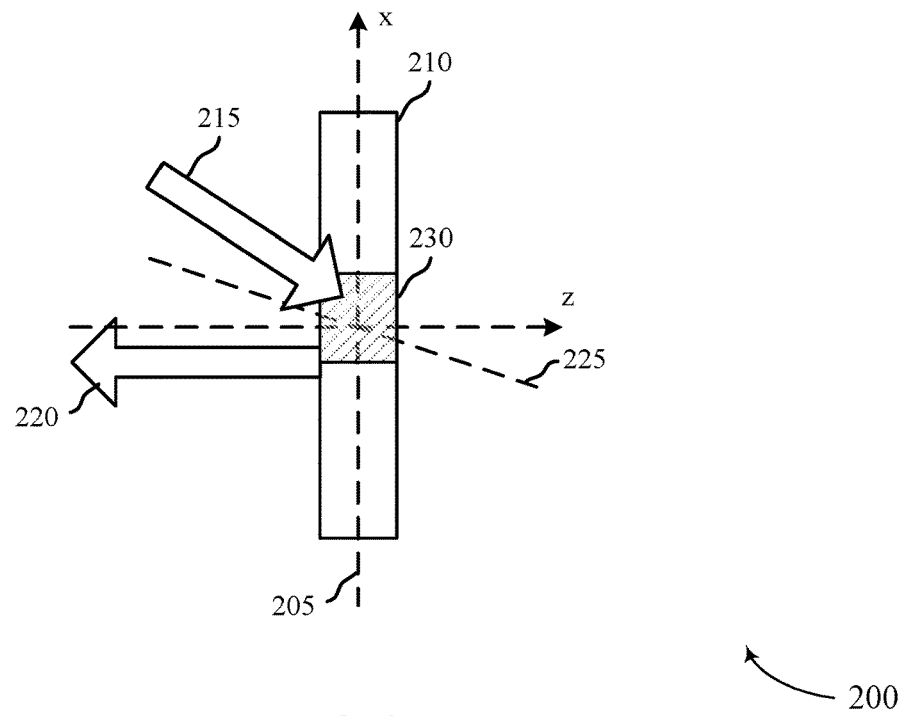
FIG. 2A is a cross-section view illustrating reflective properties of a skew mirror in real space according to one example.

FIG. 2A is a cross-section view 200 illustrating reflective properties of a skew mirror 210 in real space according to one example. The cross-section view 200 may include a grating structure such as hologram 230 in a grating medium. FIG. 2A omits skew mirror components other than the grating medium, such as an additional layer that might serve as a substrate or protective layer for the grating medium. The substrate or protective layer may serve to protect the grating medium from contamination, moisture, oxygen, reactive chemical species, damage, and the like. Implementations of a skew mirror or skew mirror-like component for use in optical systems that include polarization management techniques may be partially reflective. In this manner, skew mirrors or skew mirror like components may be configured to selectively reflect the rays of light to guide the rays of light to a particular optical element and/or to form an exit pupil towards an eye box of an optical system. In some examples, a skew mirror or skew mirror like components may be configured to avoid reflecting the rays of light for certain incidence angles where such a reflection would reflect the rays of light to an area that is not toward the desired location (e.g., toward a light coupling device by a cross coupler or toward an exit pupil by an output coupler). Implementations of some skew mirror embodiments may require relatively high dynamic range recording medium to achieve high reflectivity over a relatively wide wavelength bandwidth and angle range for the resulting grating medium. By contrast, other skew mirror embodiments that are configured to avoid reflecting the rays of light for certain incidence angles may require less dynamic range thereby allowing each hologram to be stronger (e.g., recorded with a greater intensity and/or longer exposure time). A skew mirror or skew mirror components composed of stronger holograms may provide a brighter image, or allow a dimmer light projector to provide an image of equal brightness. Skew mirror 210 is characterized by reflective axis 225 at an angle measured with respect to the z-axis. The z-axis is normal to the skew mirror 210 axis. The skew mirror 210 is illuminated with the incident light 215 with an internal incidence angle that is measured with respect to the z-axis. The principal reflected light 220 may be reflected with internal reflection angle 180° measured with respect to the z-axis. The principal reflected light 220 may correspond to wavelengths of light residing in the red, green, and blue regions of the visible spectrum.

For example, the red, green, and blue regions of the visible spectrum may include a red wavelength (e.g., 610-780 nm) band, green wavelength (e.g., 493-577 nm) band, and blue wavelength (e.g., 405-492 nm) band. In other examples, the principal reflected light 220 may correspond to wavelengths of light residing outside of the visible spectrum (e.g., infrared and ultraviolet wavelengths).

The skew mirror 210 may have multiple hologram regions which all share substantially the same reflective axis 225. These multiple regions, however, may each reflect light for different ranges of angles of incidence.

Figure 2B:
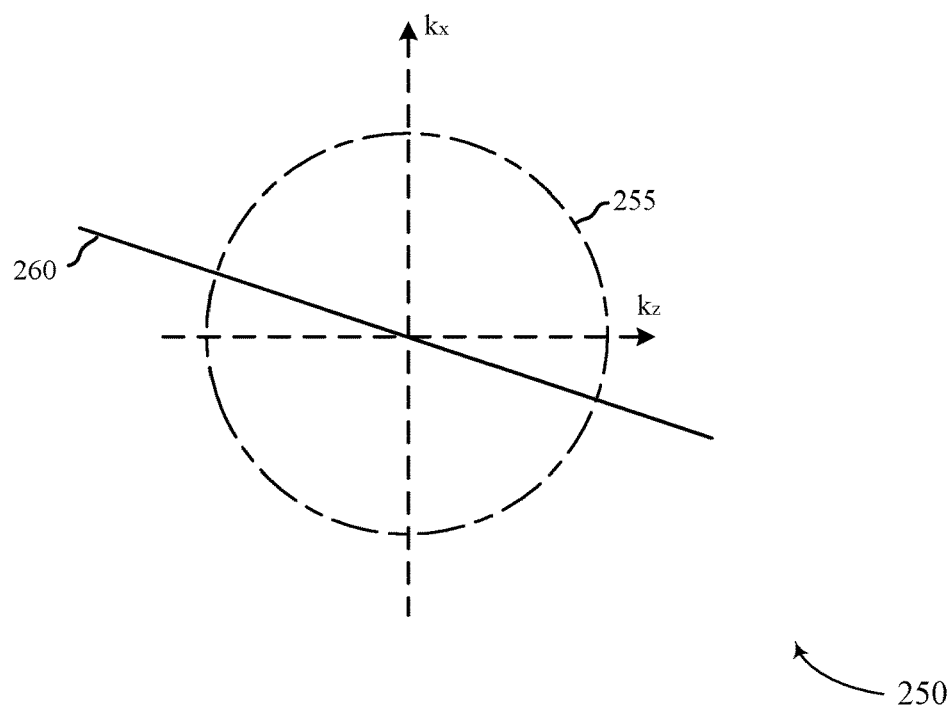
FIG. 2B illustrates a k-space representation of the skew mirror of FIG. 2A.

FIG. 2B illustrates a k-space representation 250 of the skew mirror 210 of FIG. 2A. The k-space distributions of spatially varying refractive index components are typically denoted $\Delta n(\vec{k})$. $\Delta n(\vec{k})$ k-space distribution 260 passes through the origin, and has an angle measured with respect to the z-axis, equal to that of the reflective axis 225. Recording k-sphere 255 is the k-sphere corresponding to a particular writing wavelength. K-space 250 may include various k-spheres corresponding to wavelengths of light residing in the red, green, and blue regions of the visible spectrum.

The k-space formalism is a method for analyzing holographic recording and diffraction. In k-space, propagating optical waves and holograms are represented by three dimensional Fourier transforms of their distributions in real space. For example, an infinite collimated monochromatic reference beam can be represented in real space and k-space by equation (1):

$$E_r(\vec{r}) = A_r\exp(i\vec{k}_r \cdot \vec{r}) \xrightarrow{\mathcal{F}} E_r(\vec{k}) = A_r\delta(\vec{k} - \vec{k}_r), \quad (1)$$

where $E_r(\vec{k})$ is the optical scalar field distribution at all $\vec{k} = \{x,y,z\}$ 3D spatial vector locations, and its transform $E_r(\vec{k})$ is the optical scalar field distribution at all $\vec{k} = \{k_x, k_y, k_z\}$ 3D spatial frequency vectors. $A_r$ is the scalar complex amplitude of the field; and $\vec{k}_r$ is the wave vector, whose length indicates the spatial frequency of the light waves, and whose direction indicates the direction of propagation. In some implementations, all beams are composed of light of the same wavelength, so all optical wave vectors must have the same length, i.e., $|\vec{k}_r| = k_n$. Thus, all optical propagation vectors must lie on a sphere of radius $k_n = 2\pi n_0/\lambda$, where $n_0$ is the average refractive index of the hologram ("bulk index"), and is the vacuum wavelength of the light. This construct is known as the k-sphere. In other implementations, light of multiple wavelengths may be decomposed into a superposition of wave vectors of differing lengths, lying on different k-spheres.

Another important k-space distribution is that of the holograms themselves. Volume holograms usually consist of spatial variations of the index of refraction within a grating medium. The index of refraction spatial variations, typically denoted $\Delta n(\vec{k})$, can be referred to as index modulation patterns, the k-space distributions of which are typically denoted $\Delta n(\vec{k})$. The index modulation pattern created by interference between a first recording beam and a second recording beam is typically proportional to the spatial intensity of the recording interference pattern, as shown in equation (2):

$$\Delta n(\vec{k}) \propto |E_1(\vec{k}) + E_2(\vec{k})|^2 = |E_1(\vec{k})|^2 + |E_2(\vec{k})|^2 + E_1^*(\vec{k})E_2(\vec{k}) + E_1(\vec{k})E_2^*(\vec{k}), \quad (2)$$

where $E_1(\vec{k})$ is the spatial distribution of the signal first recording beam field and $E_2(\vec{k})$ is the spatial distribution of the second recording beam field. The unary operator * denotes complex conjugation. The final term in equation (2), $E_1(\vec{k})E_2*(\vec{k})$, maps the incident second recording beam into the diffracted first recording beam. Thus the following equation may result:

$$E_1(\vec{r})E_2^*(\vec{r}) \xrightarrow{\mathfrak{I}} E_1(\vec{k}) \otimes E_2(\vec{k}), \qquad (3)$$

where $\otimes$ is the 3D cross correlation operator. This is to say, the product of one $\otimes$ optical field and the complex conjugate of another in the spatial domain becomes a cross correlation of their respective Fourier transforms in the frequency domain.

Typically, the hologram 230 constitutes a refractive index distribution that is real-valued in real space. Locations of $\Delta n(\vec{k})$ k-space distributions of the hologram 230 may be determined mathematically from the cross-correlation operations $E_2(\vec{k}) \otimes E_1(\vec{k})$ and $E_1(\vec{k}) \otimes E_2(\vec{k})$, respectively, or geometrically from vector differences $\vec{k}_{G+} = \vec{k}_1 - k_2$ and $\vec{k}_{G-} = \vec{k}_2 - \vec{k}_1$, where $\vec{k}_{G+}$ and $\vec{k}_{G-}$ are grating vectors from the respective hologram $\Delta n(\vec{k})$ k-space distributions to the origin (not shown individually). Note that by convention, wave vectors are represented by a lowercase "k," and grating vectors by uppercase "K."

Once recorded, the hologram 230 may be illuminated by a probe beam to produce a diffracted beam. For purposes of the present disclosure, the diffracted beam can be considered a reflection of the probe beam, which can be referred to as an incident light beam (e.g., image-bearing light). The probe beam and its reflected beam are angularly bisected by the reflective axis 225 (i.e., the internal angle of incidence of the probe beam relative to the reflective axis has the same magnitude as the internal angle of reflection of the reflected beam relative to the reflective axis). The diffraction process can be represented by a set of mathematical and geometric operations in k-space similar to those of the recording process. In the weak diffraction limit, the diffracted light distribution of the diffracted beam is given by equation (4), $$E_d(\vec{k}) \propto \Delta n(\vec{k}) * E_p(\vec{k})|_{|\vec{k}|=k_n}$$

where $E_d(\vec{k})$ and $E_p(\vec{k})$ are k-space distributions of the diffracted beam and the probe beam, respectively; and "*" is the 3D convolution operator. The notation "$|_{|\vec{k}|=k_n}$" indicates that the preceding expression is evaluated only where $|\vec{k}|=k_n$, i.e., where the result lies on the k-sphere. The convolution $\Delta n(\vec{k}) * E_p(\vec{k})$ represents a polarization density distribution, and is proportional to the macroscopic sum of the inhomogeneous electric dipole moments of the grating medium induced by the probe beam, $E_p(\vec{k})$.

Typically, when the probe beam resembles one of the recording beams used for recording, the effect of the convolution is to reverse the cross correlation during recording, and the diffracted beam will substantially resemble the other recording beam used to record a hologram. When the probe beam has a different k-space distribution than either of the recording beams used for recording, the hologram may produce a diffracted beam that is substantially different than the beams used to record the hologram. Note also that while the recording beams are typically mutually coherent, the probe beam (and diffracted beam) is not so constrained. A multi-wavelength probe beam may be analyzed as a superposition of single-wavelength beams, each obeying Equation (4) with a different k-sphere radius.

Persons skilled in the art given the benefit of the present disclosure will recognize that the term probe beam, typically used here when describing skew mirror properties in k-space, is analogous to the term incident light, which is typically used here when describing skew mirror reflective properties in real space. Similarly, the term diffracted beam, typically used here when describing skew mirror properties in k-space, is analogous to the term principal reflected light, typically used here when describing skew mirror properties in real space. Thus when describing reflective properties of a skew mirror in real space, it is typical to state that incident light is reflected by a hologram (or other grating structure) as principal reflected light, though to state that a probe beam is diffracted by the hologram to produce a diffracted beam says essentially the same thing. Similarly, when describing reflective properties of a skew mirror in k-space, it is typical to state that a probe beam is diffracted by a hologram (or other grating structure) to produce a diffracted beam, though to state that incident light is reflected by the grating structure to produce principal reflected light has the same meaning in the context of implementations of the present disclosure.

Figure 3A:
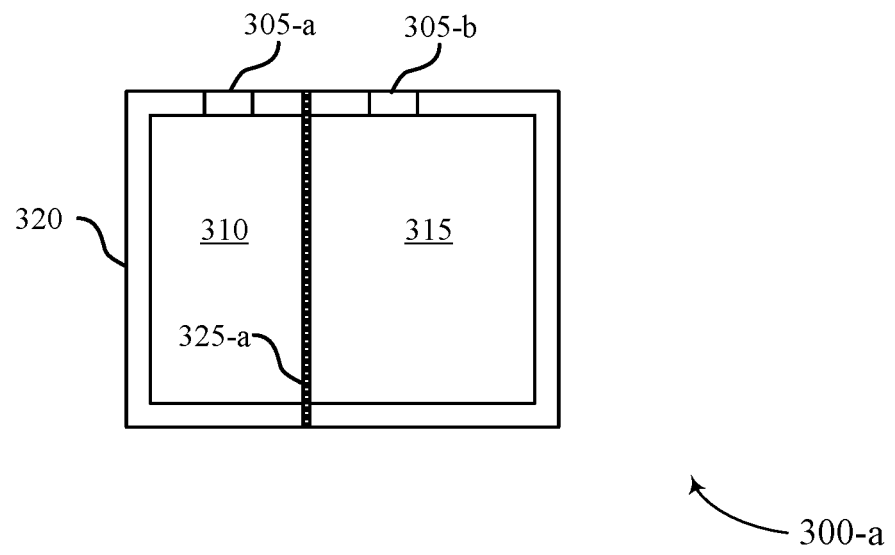
FIG. 3A illustrates an example of a split media cell fabrication for creating an optical system that includes polarization management techniques in accordance with various aspects of the present disclosure.

FIG. 3A illustrates an example of a split media cell 300 fabrication that includes polarization management techniques in accordance with various aspects of the present disclosure. A split media cell 300 may be separated by one or more dividers so that each sub-cell may be filled with holographic recording media and recorded independently. The split media cell 300 may comprise fill ports 305-a and 305-b, a first sub-cell 310, a second sub-cell 315, a spacer layer 320, and a polarization altering element 325-a, which may also serve as a divider.

In some implementations, the polarization altering element 325-a may separate a first sub-cell 310 and a second sub-cell 315. The polarization altering element 325-a may be an example of a birefringent material. In some cases, the polarization altering element 325-a may be held in place at the ends by a spacer layer 320. In some cases, the viscosity of the liquid holographic recording media inserted or injected into fill port 305-a may prevent leakage out of the first sub-cell 310 through gaps that may be present between the polarization altering element 325-a and the substrates. The first sub-cell 310 may include a light coupling device (e.g., a cross coupler). In some cases, the viscosity of the liquid holographic recording media inserted into fill port 305-b may prevent leakage out of the second sub-cell 315 through gaps that may be present between the polarization altering element 325-a and the substrate. The second sub-cell 315 may include another light coupling device (e.g., an output coupler). In other examples, the ends of the polarization altering element 325-a may be attached by an adhesive to an edge of a spacer layer 320.

In some examples, the polarization altering element 325-a may have a thickness of approximately 70 μm in order to reduce a portion of light rays that may propagate through the edges of the polarization altering element 325-a in the waveguide. The edges of the polarization altering element 325-a may be absorbent or otherwise treated to reduce the intensity of light rays that may propagate through the edges of the polarization altering element 325-a in the waveguide. That is, light rays that may travel through both surfaces of the polarization altering element 325-a may remain pure (e.g., the light rays may maintain their original direction) and light rays that may travel through an edge of the polarization altering element 325-a may scatter (e.g., the light rays may be deflected). In some cases, the polarization altering element 325-a may be index-matched to the recording layer and the substrates of the waveguide (not shown).

In some embodiments, the polarization altering element 325-*a* may comprise a birefringent material (e.g., a birefringent polymer strip) in order to change the polarization state of light propagating from a light coupling device formed by the first sub-cell 310 to another light coupling device formed by the second sub-cell 315.

In some embodiments, a split media cell 300 may allow the first sub-cell 310 to be filled, recorded, and cured independently of the second sub-cell 315. For example, first sub-cell 310 and second sub-cell 315 may not need to be (or desired to be) recorded at the same time. For example, the first sub-cell 310 may be filled, set (i.e., matrix thermocured), optically recorded, and optically cured while the second sub-cell 315 may remain empty. In some examples, the second sub-cell 315 may be filled, thermos-set, optically recorded, and optically cured after the first sub-cell 310 may be filled, recorded, and cured. Separate sub-cell filling, recording, and curing may have the benefit of eliminating the effects of stray light that may cross into the wrong cell during recording; and of reducing the recording-to-cure time of one or both sub-cells, which may degrade hologram quality if it becomes excessive.

Inventive aspects of the present disclosure are illustrated by the non-limiting examples of FIG. 3. For example, a device may include a first waveguide portion (e.g., formed at least in part from the first sub-cell 310) including a first layer having parallel plane surfaces. The first waveguide portion may have a first light coupling device. The device may include a second waveguide portion (e.g., formed at least in part from the second sub-cell 315) including a second layer having parallel plane surfaces. The second waveguide portion may have a second light coupling device. The device may also include a polarization altering element (e.g., polarization altering element 325-*a*) operatively coupled to a light path associated with the first light coupling device and the second light coupling device. For example, light that is input to the device (e.g., via an entrance pupil) may traverse or pass through the light path optical elements including the first light coupling device, the polarization altering element, and the second light coupling device.

Additionally or alternatively, the polarization altering element may be included in both the first layer and the second layer. In some examples, the device may comprise a third layer (e.g., a substrate) having parallel plane surfaces. The third layer may be positioned such that a surface of the parallel plane surfaces of the third layer contacts both a surface of the parallel plane surfaces of the first layer and a surface of the parallel plane surfaces of the second layer.

Figure 3B:
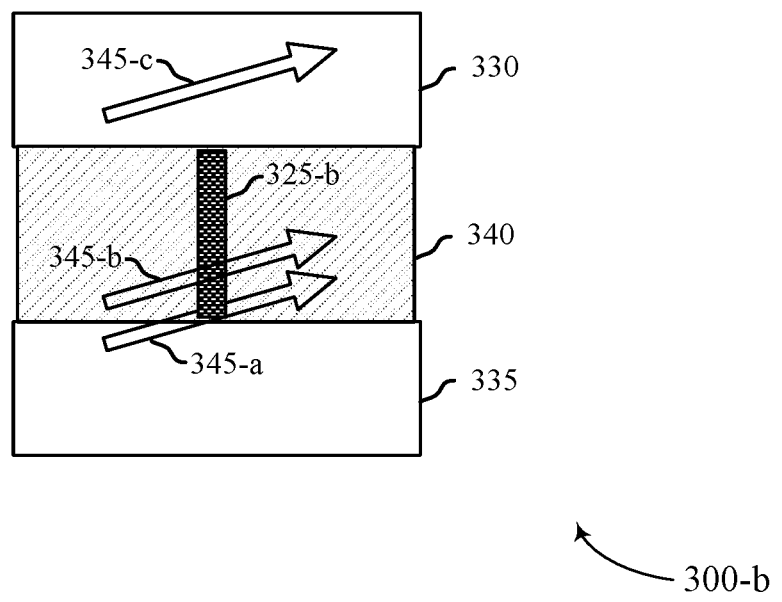
FIG. 3B illustrates an example of a cross sectional view of FIG. 3A that includes polarization management techniques in accordance with various aspects of the present disclosure.

FIG. 3B illustrates an example of a cross sectional view of FIG. 3A that includes polarization management techniques in accordance with various aspects of the present disclosure. Optical system 300-*b* may be utilized in an application such as an HMD device. Optical system 300-*b* may include a first substrate 330, a second substrate 335, a grating medium 340, and a polarization altering element 325-*b*. In some case, the polarization of light within the waveguide may be altered such that an intensity of the reflected mode of skew mirror components may be increased.

In some embodiments, a birefringent material may be incorporated into the polarization altering element 325-*b* in order to change the polarization state of light ray 345-*a* propagating through the waveguide. The edges of the polarization altering element 325-*b* may be absorbent or otherwise treated to reduce the intensity of light ray 345-*a* that may propagate through the edges of the polarization altering element 325-*b* in the waveguide. That is, light ray 345-*b* that may travel through both surfaces of the polarization altering element 325-*b* may rotate polarization (e.g., 900 polarization rotation) and light ray 345-*a* that may travel through an edge of the polarization altering element 325-*b* may scatter. In some cases, light ray 345-*c* may travel through the first substrate 330 without propagating through the polarization altering element 325-*b*. For example, light ray 345-*c* may not experience a rotation of polarization.

Figure 4A:
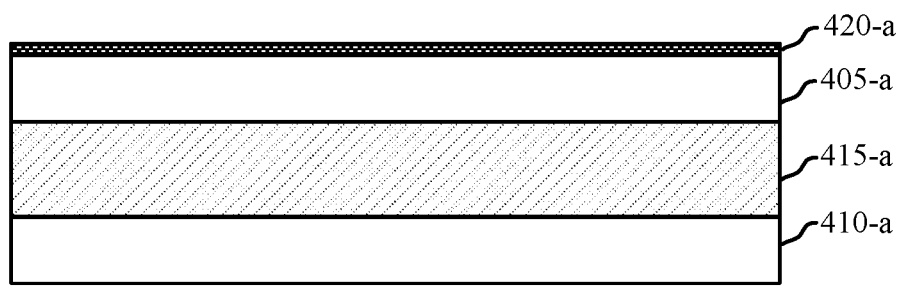
FIG. 4A illustrates an example of an optical system that includes polarization management techniques in accordance with various aspects of the present disclosure.

FIG. 4A illustrates an example of an optical system 400-*a* that includes polarization management techniques in accordance with various aspects of the present disclosure. Optical system 400-*a* may be utilized in an application such as an HMD device. Optical system 400-*a* may include a first substrate 405-*a*, a second substrate 410-*a*, a grating medium 415-*a*, and a polarization altering element 420-*a*. In some case, the polarization of light within the waveguide may be altered such that an intensity of the reflected mode of skew mirror components may be increased.

In some implementations, the polarization altering element 420-*a* (e.g., a birefringent or optically active material) may be distributed throughout the waveguide to alter the polarization of the light as it propagates through the waveguide. For example, the polarization altering element 420-*a* may be used as the first substrate 405-*a* of the waveguide. In other examples, the polarization altering element 420-*a* may be used as the second substrate 410-*a* of the waveguide (not shown).

Inventive aspects of the present disclosure are illustrated by the non-limiting examples of FIG. 4A. For example, a device may include a waveguide, a first polarization altering element, and a first light coupling device. The waveguide may include a first layer having parallel plane surfaces and a second layer having parallel plane surfaces. The first polarization altering element may be positioned between the first layer and the second layer. The first light coupling device may be disposed within the second layer. The device may also have a second polarization altering element (e.g., polarization altering element 420-*a*) positioned on a surface of the first layer that is opposite of a surface of the first layer that contacts the first polarization altering element. In some examples, a second light coupling device may be disposed within the second layer. The second light coupling device may have a second reflective axis different from a first reflective axis of the first light coupling device.

Figure 4B:
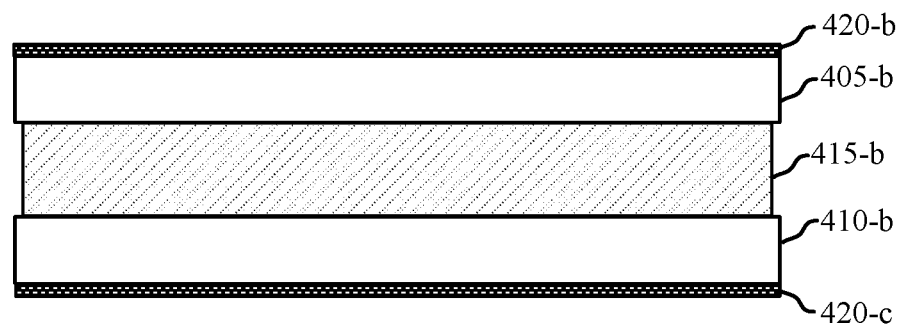
FIG. 4B illustrates an example of an optical system that includes polarization management techniques in accordance with various aspects of the present disclosure.

FIG. 4B illustrates an example of an optical system 400-*b* that includes polarization management techniques in accordance with various aspects of the present disclosure. Optical system 400-*b* may be utilized in an application such as an HMD device. Optical system 400-*b* may include a first substrate 405-*b*, a second substrate 410-*b*, a grating medium 415-*b*, and polarization altering elements 420-*b* and 420-*c*. The polarization altering element 420-*b* may be used as the first substrate 405-*b* of the waveguide and the polarization altering element 420-*c* may be used as the second substrate 410-*b* of the waveguide.

Figure 4C:
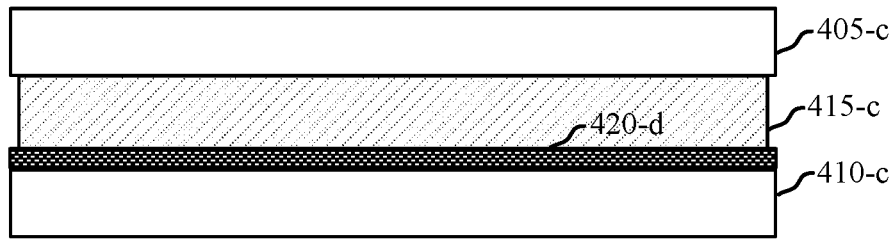
FIG. 4C illustrates an example of an optical system that includes polarization management techniques in accordance with various aspects of the present disclosure.

FIG. 4C illustrates an example of an optical system 400-*c* that that includes polarization management techniques in accordance with various aspects of the present disclosure. Optical system 400-*c* may be utilized in an application such as an HMD device. Optical system 400-*c* may include a first substrate 405-*c*, a second substrate 410-*c*, a grating medium 415-*c*, and a polarization altering element 420-*d*.

In some cases, an additional polarization altering element 420-*d* (e.g., stretched, plastic film) may be layered inside the waveguide in addition to the grating medium 415-*c*, first substrate 405-*c*, and second substrate 410-*c* to increase the birefringence and rotate the polarization of light guided within the waveguide. For example, the polarization altering element 420-*d* may be adhered to the internal surface of the second substrate 410-*c* of the waveguide. The polarization altering element 420-*d* may also be adhered to both the internal surface of the first substrate 405-*c* and the second substrate 410-*c* of the waveguide (not shown).

Inventive aspects of the present disclosure are illustrated by the non-limiting examples of FIG. 4C. For example, a device may include a waveguide including a first layer (e.g., first substrate 405-*c*) having parallel plane surfaces and a second layer (e.g., grating medium 415-*c*) having parallel plane surface. The device may include a first polarization altering element (e.g., polarization altering element 420-*d*) positioned between the first layer and the second layer and a first light coupling device disposed within the second layer.

Figure 4D:
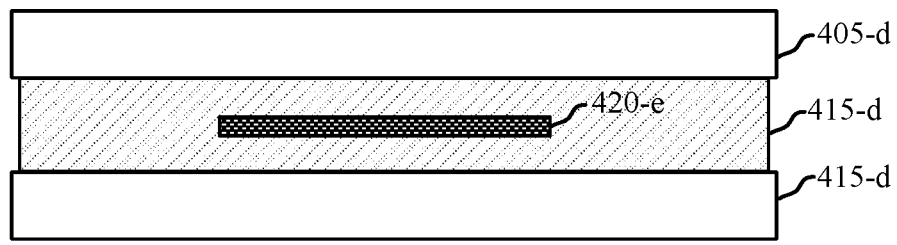
FIG. 4D illustrates an example of an optical system that includes polarization management techniques in accordance with various aspects of the present disclosure.

FIG. 4D illustrates an example of an optical system 400-*d* that includes polarization management techniques in accordance with various aspects of the present disclosure. Optical system 400-*d* may be utilized in an application such as an HMD device. Optical system 400-*d* may include a first substrate 405-*d*, a second substrate 410-*d*, a grating medium 415-*d*, and a polarization altering element 420-*e*.

Inventive aspects of the present disclosure are illustrated by the non-limiting examples of FIG. 4D. For example, a device may include a waveguide, a first polarization altering element, and a first light coupling device. The waveguide may include a first layer having parallel plane surfaces and a second layer having parallel plane surfaces. The first polarization altering element may be positioned between the first layer and the second layer. The first light coupling device may be disposed within the second layer. A third polarization altering element (e.g., polarization altering element 420-*e*) may be disposed within the second layer (e.g., grating medium 415-*d*).

Figure 5:
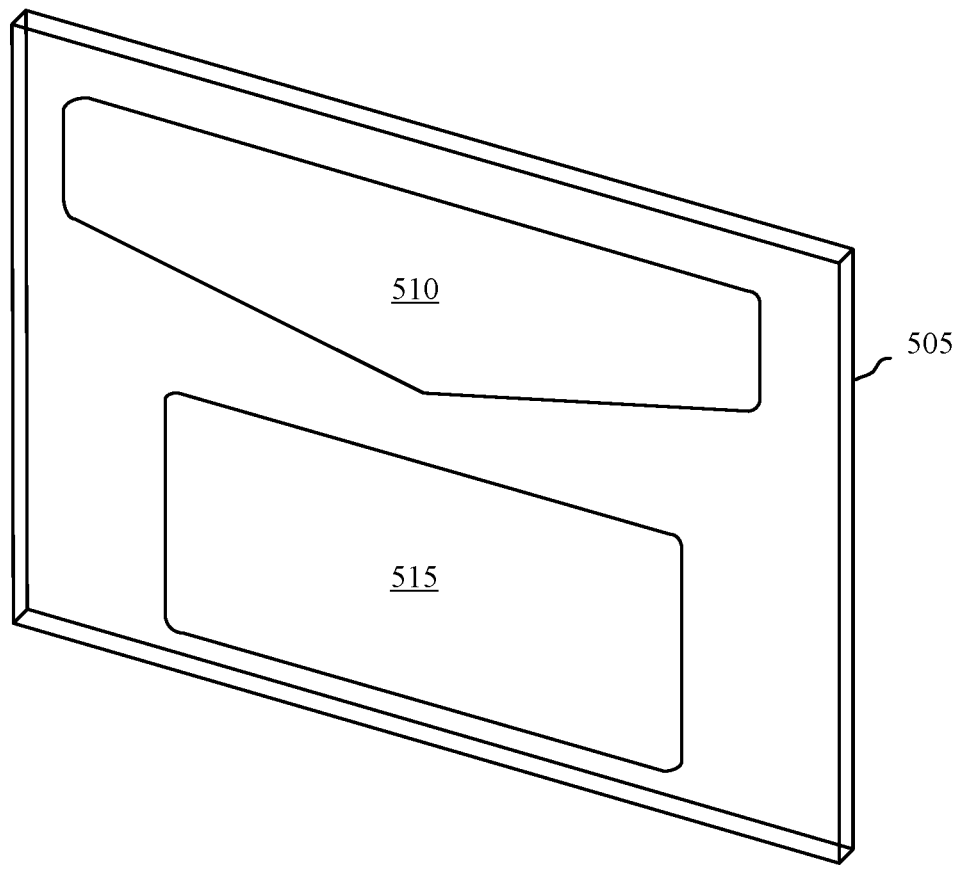
FIG. 5 illustrates an example of an optical system that includes polarization management techniques in accordance with aspects of the present disclosure.

FIG. 5 illustrates an example of an optical system 500 that includes polarization management techniques in accordance with various aspects of the present disclosure. Optical system 500 may be utilized in an application such as an HMD device. Optical system 500 may include a waveguide 505 that houses a first light coupling device 510 and a second light coupling device 515.

In some implementations, a first light coupling device 510 (e.g., a cross coupler) may be at a first location within the waveguide 505 and a second light coupling device 515 (e.g., an output coupler) may be at a second location within the waveguide 505. In some examples, the polarization of light that propagates through the waveguide 505 at a first location may be approximately aligned for high coupling efficiency (i.e. p-polarization). The light may couple into the second light coupling device 515 at a second location or couple out of the waveguide 505. In some cases, light that may be p-polarized at a first location may propagate down the waveguide 505 and participate in the diffraction process as the polarization of the light rotates to s-polarization in a second location.

Figure 6A:
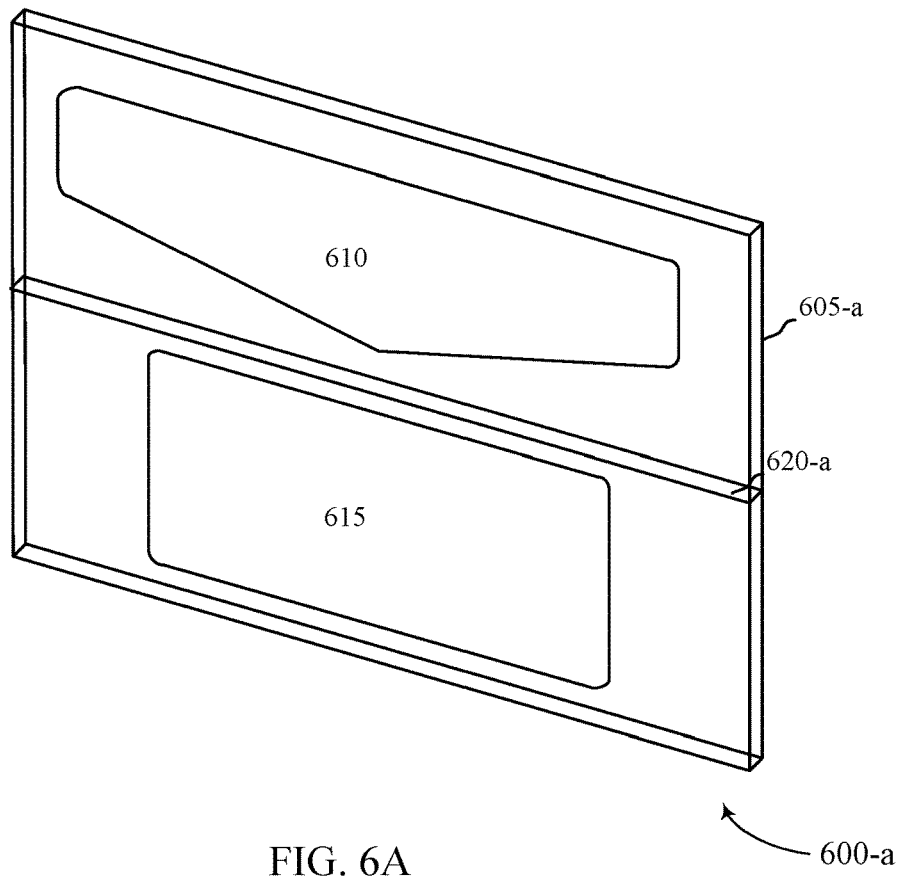
FIG. 6A illustrates an example of an optical system that includes polarization management techniques in accordance with aspects of the present disclosure.

FIG. 6A illustrates an example of an optical system 600-*a* that includes polarization management techniques in accordance with various aspects of the present disclosure. Optical system 600-*a* may be utilized in an application such as an HMD device. Optical system 600-*a* may include a waveguide 605-*a*, a first light coupling device 610, a second light coupling device 615, and a polarization altering element 620-*a*.

In some implementations, a first light coupling device 610 (e.g., a cross coupler) may be at a first location within the waveguide 605-*a* and a second light coupling device 615 (e.g., an output coupler) may be at a second location within the waveguide 605-*a*. In some examples, the first light coupling device 610 may be physically separate from the second light coupling device 615. In some cases, the gap between the first light coupling device 610 and the second light coupling device 615 may contain a polarization altering element 620-*a* (e.g., a half-wave plate) to rotate the polarization of light that propagates through the waveguide 605-*a*. In some cases, polarization altering element 620-*a* may separate an entirety of the thickness of the waveguide 605-*a* (i.e., separate a media layer and substrate layer(s) of waveguide 605-*a*). For example, as light propagates down the first light coupling device 610, the light may pass through the polarization altering element 620-*a* and rotate the polarization of light from p-polarized light to s-polarized light or vice versa. The light may then reflect to the second light coupling device 615 and diffract out of the waveguide 605-*a*.

In some cases, polarization altering element 620-*a* may produce different effects among light of different wavelengths and angles of propagation. For example, polarization altering element 620-*a* may produce a half wave of retardance for light of a first wavelength (e.g., red light) at a normal angle of incidence and may produce a half wave of increased retardance for light of a second wavelength (e.g., blue light) at an angle of incidence of 60° That is, a half wave plate may indicate that the retardance of the polarization altering element 620-*a* may not equal a half wave over all angles of incidence and all wavelengths of light.

In some embodiments, the techniques described herein may produce various polarization states of light, (e.g., circular and elliptical states) which may improve the coupling efficiency of a first light coupling device and a second light coupling device. In some cases, the amount of birefringent material in the polarization altering element 620-*a* may be variable. For example, an additional polarization altering element 620-*a* (e.g., a third wave plate) may convert p-polarized light to a first elliptical state at a first propagation and may convert p-polarized light to a second elliptical state upon a second propagation (not shown). If the first and second elliptical state may have the same magnitude corresponding to the magnitude of s-polarized light, then the effects of the polarization altering element 620-*a* may be independent of the number of times the light may propagate through the polarization altering element 620-*a*.

Figure 6B:
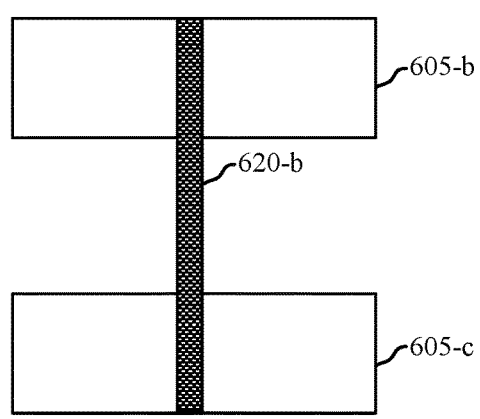
FIG. 6B illustrates an example of a cross sectional view of FIG. 6A that includes polarization management techniques in accordance with various aspects of the present disclosure.

FIG. 6B illustrates an example of a cross sectional view of FIG. 6A that includes polarization management techniques in accordance with various aspects of the present disclosure. Optical system 600-*b* may be utilized in an application such as an HMD device. Optical system 600-*b* may include a waveguide 605-*b* and 605-*c* and a polarization altering element 620-*b*. In some cases, polarization altering element 620-*b* may extend through the waveguide 605-*b* and 605-*c*.

Figure 7:
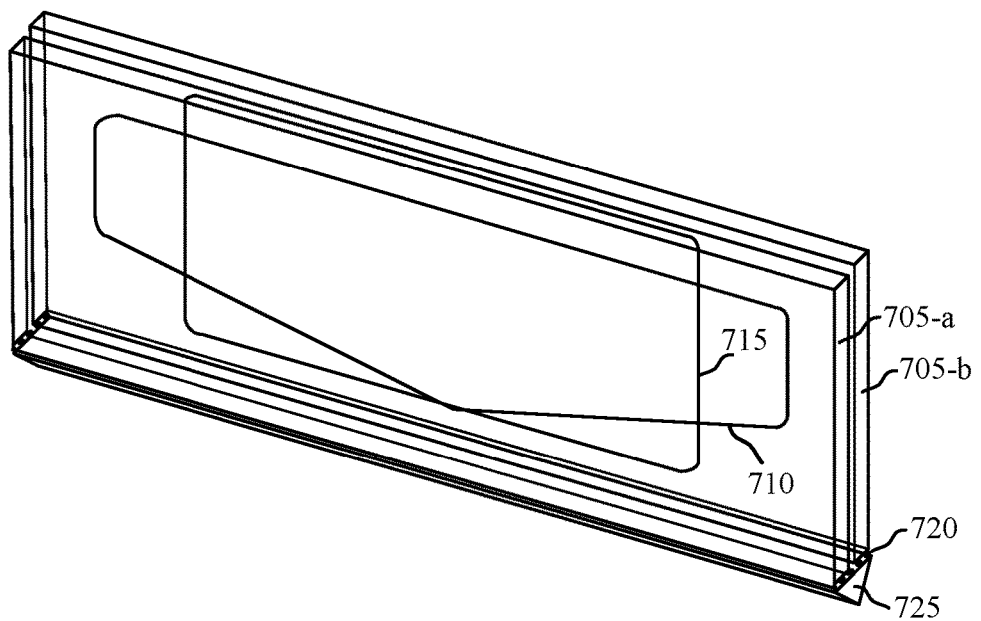
FIG. 7 illustrates an example of an optical system that includes polarization management techniques in accordance with aspects of the present disclosure.

FIG. 7 illustrates an example of an optical system 700 that includes polarization management techniques in accordance with various aspects of the present disclosure. Optical system 700 may be utilized in an application such as an HMD device. Optical system 700 may include a first waveguide portion 705-*a*, a second waveguide portion 705-*b*, a first light coupling device 710, a second light coupling device 715, and a polarization altering element 720.

In some implementations, the first light coupling device 710 (e.g., a cross coupler) may be at a first location within the first waveguide portion 705-*a* and the second light coupling device 715 (e.g., an output coupler) may be at a second location within the second waveguide portion 705-*b*. In some examples, the first light coupling device 710 and the second light coupling device 715 may be in arranged in folded configuration. The polarization altering element 720 (e.g., a half-wave plate) may be positioned in a light path between the first light coupling device 710 and the second light coupling device 715. For example, the polarization of light through the first waveguide portion 705-*a* to the second waveguide portion 705-*b* may be controlled by a polarization altering element 720 inserted between the edges of the first and second waveguide portions 705-*a*, 705-*b* and a roof prism 725.

In some cases, the polarization of light throughout the first and second waveguide portions 705-*a*, 705-*b* may be controlled by changing the Fresnel reflection coefficients of the roof prism 725 additionally or alternatively with the inclusion of the polarization altering element 720 in the light path light path between the first light coupling device 710 and the second light coupling device 715.

Inventive aspects of the present disclosure are illustrated by the non-limiting examples of FIG. 7. For example, a device may include a first waveguide portion (e.g., first waveguide portion 705-*a*) including a first layer having parallel plane surfaces. The first waveguide portion may have a first light coupling device. The device may include a second waveguide portion (e.g., second waveguide portion 705-*b*) including a second layer having parallel plane surfaces. The second waveguide portion may have a second light coupling device. The device may also include a polarization altering element (e.g., polarization altering element 720) operatively coupled to a light path associated with the first light coupling device and the second light coupling device.

In some examples, the polarization altering element may be positioned such that a surface of the polarization altering element contacts both an edge of the first layer (e.g., first waveguide portion 705-*a* including first light coupling device 710) and an edge of the second layer (e.g., second waveguide portion 705-*b* including second light coupling device 715). In some examples, the edge of the first layer may be perpendicular to the parallel plane surfaces of the first layer. Additionally or alternatively, a third light coupling device (e.g., roof prism 725) may be positioned to contact a surface of the polarization altering element different from the surface of the polarization altering element that contacts both the edge of the first layer and the edge of the second layer. In some examples, light that is input to the device (e.g., via an entrance pupil) may traverse or pass through the light path optical elements including the first light coupling device, the polarization altering element, the third light coupling device, and the second light coupling device.

Figure 8A:
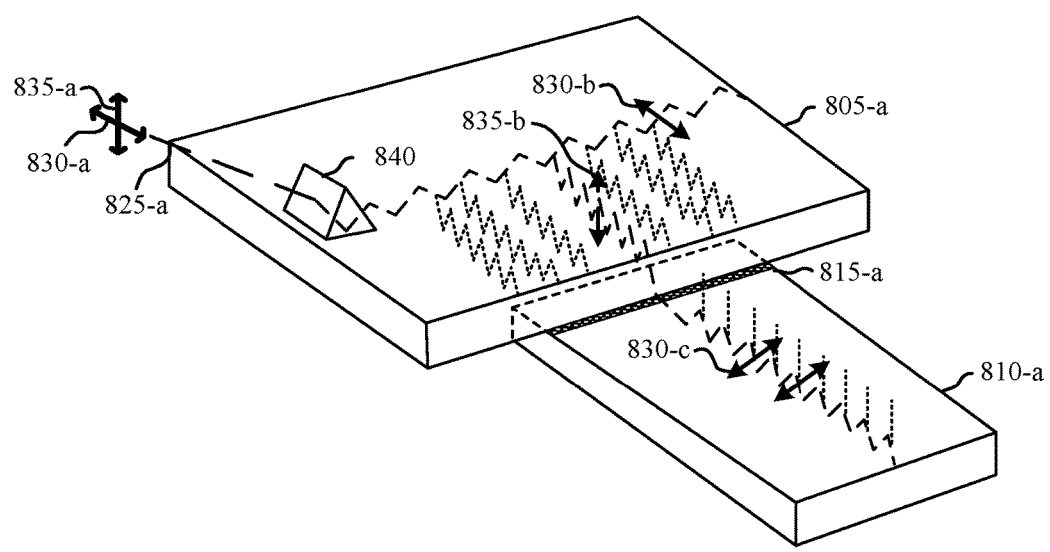
FIG. 8A illustrates an example of an optical system that includes polarization management techniques in accordance with aspects of the present disclosure.

FIG. 8A illustrates an example of an optical system 800-*a* that includes polarization management techniques in accordance with various aspects of the present disclosure. Optical system 800-*a* may be utilized in an application such as an HMD device. Optical system 800-*a* may include a first waveguide 805-*a*, a second waveguide 810-*a*, and a polarization altering element 815-*a*.

Optical system 800-*a* illustrates light 825-*a* entering the input prism 840 and then the first waveguide 805-*a*. In order for light 825-*a* to be reflected, light 825-*a* may propagate through the first waveguide 805-*a* by total internal reflection. For example, light 825-*a* may propagate through the first waveguide 805-*a* and reflect between a downward mode direction and an upward mode direction. Light 825-*a* may include a p-polarized component as depicted by arrow 835-*a* and a s-polarized component as depicted by arrow 830-*a*. Light 825-*a* may be polarized in the first waveguide 805-*a* with an electric field component perpendicular to the plane of incidence (e.g., p-polarized) as depicted by arrow 835-*b*. Light may also be polarized in the first waveguide 805-*a* with an electric field parallel to the plane of incidence (e.g., s-polarized) as depicted by arrow 830-*b*.

In some embodiments, first waveguide 805-*a* may be positioned with abutting surfaces relative to the second waveguide 810-*a* (i.e., in a trap-door configuration). In some cases, polarization altering element 815-*a* may be located between a first waveguide 805-*a* and a second waveguide 810-*a*. In some examples, light 825-*a* may change polarization as light 825-*a* travels from the first waveguide 805-*a* through the polarization altering element 815-*a* to the second waveguide 810-*a*. For example, light 825-*a* may change from p-polarized light, as depicted by arrow 835-*b*, to s-polarized light, as depicted by arrow 830-*c*. Therefore, light 825-*a* may propagate through second waveguide 810-*a* with a polarization different from the first waveguide 805-*a*. In some examples, the polarization altering element 815-*a* may be 6 mm×25 mm×0.07 mm.

Inventive aspects of the present disclosure are illustrated by the non-limiting examples of FIG. 8A. For example, a device may include a first waveguide portion (e.g., first waveguide 805-*a*) including a first layer having parallel plane surfaces. The first waveguide portion may have a first light coupling device. The device may include a second waveguide portion (e.g., second waveguide 810-*b*) including a second layer having parallel plane surfaces. The second waveguide portion may have a second light coupling device. The device may also include a polarization altering element (e.g., polarization altering element 815-*a*) operatively coupled to a light path associated with the first light coupling device and the second light coupling device.

In some examples, the polarization altering element may be positioned such that a surface of the polarization altering element contacts a surface of the first waveguide portion and an opposing surface of the polarization altering element contacts a surface of the second waveguide portion. Additionally or alternatively, the polarization altering element may be a half-wave plate. In some examples, the polarization altering element may include a light absorbing edge.

Figure 8B:
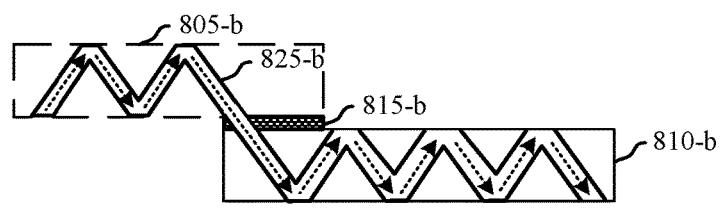
FIG. 8B illustrates an example of an optical system that includes polarization management techniques in accordance with aspects of the present disclosure.

FIG. 8B illustrates an example of a side-view of optical system 800-*b* that includes polarization management techniques in accordance with various aspects of the present disclosure. Optical system 800-*b* may be utilized in an application such as an HMD device. Optical system 800-*b* may include a first waveguide 805-*b*, a second waveguide 810-*b*, and a polarization altering element 815-*b*. For example, first waveguide 805-*b* may be positioned with abutting surfaces relative to the second waveguide 810-*b* (i.e., in a trap-door configuration). In some cases, polarization altering element 815-*b* may be located between a first waveguide 805-*b* and a second waveguide 810-*b*. Light 825-*b* may propagate through the first waveguide 805-*b* and pass through the polarization altering element 815-*b* to then propagate through the second waveguide 810-*b*.

Figure 9:
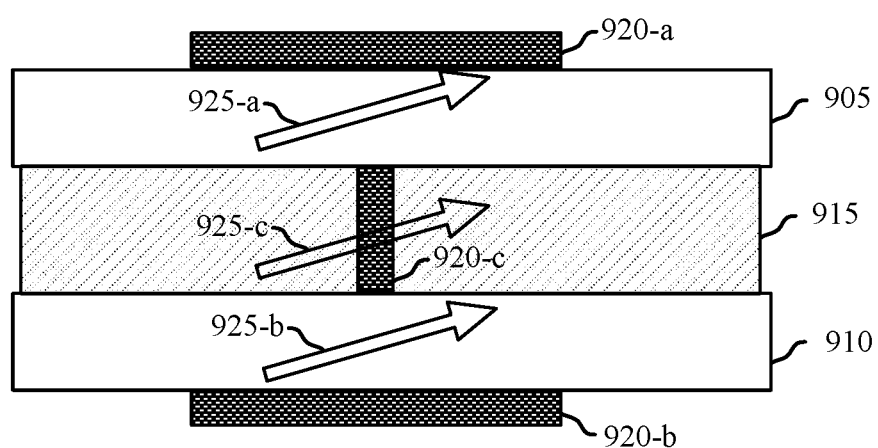
FIG. 9 illustrates an example of an optical system that includes polarization management techniques in accordance with aspects of the present disclosure.

FIG. 9 illustrates an example of an optical system 900 that that includes polarization management techniques in accordance with various aspects of the present disclosure. Optical system 900 may be utilized in an application such as an HMD device. Optical system 900 may include a first substrate 905, a second substrate 910, a grating medium 915, and a polarization altering element 920-*a*, 920-*b*, 920-*c*.

In some embodiments, a polarization altering elements 920-*a* and 920-*b* may be adhered to the outside surface of the first substrate 905 and the second substrate 910, respectively, in order to change the polarization state of light 925-*a* and

925-*b* propagating through the waveguide. For example, polarization altering elements 920-*a* and 920-*b* may be positioned along the first substrate 905 and the second substrate 910, respectively, in order to maximize the brightness of the projected image. That is, the size, location, and number of polarization altering elements 920-*a* and 920-*b* may be adjusted to improve the uniformity and the brightness of the projected image. In some cases, the polarization altering element 920-*c* may change the polarization state of light 925-*c* propagating through the waveguide. That is, light 925-*c* that may travel through both surfaces of the polarization altering element 920-*c* may rotate polarization (e.g., 900 polarization rotation).

Figure 10:
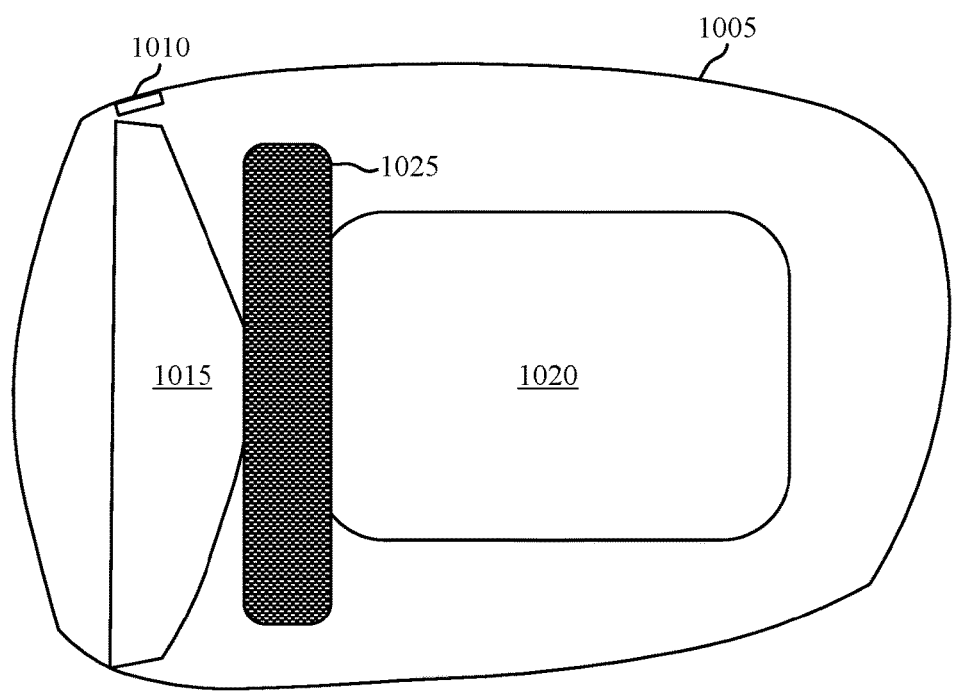
FIG. 10 illustrates an example of an optical lens that includes polarization management techniques in accordance with aspects of the present disclosure.

FIG. 10 illustrates an example of an optical lens 1000 that includes polarization management techniques in accordance with various aspects of the present disclosure. The optical lens 1000 may include waveguide 1005, light input section 1010, first light coupling device 1015 (e.g., cross coupler), second light coupling device 1020 (e.g., output coupler), and polarization altering element 1025. Waveguide 1005 may also include another light coupling device (e.g., an input coupler); however, the input coupler is ignored for the purpose of illustration). Waveguide 1005 may include a first and second surface parallel to each other and a light receiving end proximal to the light input section 1010.

In some examples, polarization altering element 1025 may be located between first light coupling device 1015 and second light coupling device 1020. In some cases, polarization altering element 1025 may or may not spatially overlap the first light coupling device 1015 and the second light coupling device 1020. In some cases, polarization altering element 1025 may be configured to alter the polarization of light propagating in a first direction (e.g., light propagating in the y-axis direction) and alter the polarization of light propagating in a second direction (e.g., light propagating in the x-axis direction).

Inventive aspects of the present disclosure are illustrated by the non-limiting examples of FIG. 10. For example, a device may include a first waveguide portion including a first layer having parallel plane surfaces. The first waveguide portion may have a first light coupling device. The device may include a second waveguide portion including a second layer having parallel plane surfaces. The second waveguide portion may have a second light coupling device. The device may also include a polarization altering element (e.g., polarization altering element 1025) operatively coupled to a light path associated with the first light coupling device and the second light coupling device. The polarization altering element may be disposed on one or more inner or outer surfaces of one or more substrates as described herein.

For example, the first light coupling device (e.g., first light coupling device 1015) may comprise a first grating medium, a first grating structure within the first grating medium, the first grating structure being configured to reflect light of a wavelength about a first reflective axis oriented on a plane parallel to the parallel plane surfaces of the first layer at a first incidence angle, and a second grating structure within the first grating medium, the second grating structure being configured to reflect light of the wavelength about a second reflective axis substantially parallel to the first reflective axis at a second incidence angle different from the first incidence angle.

Additionally or alternatively, at least one of the first grating structure or the second grating structure may comprise a hologram. In addition, at least one of the first grating structure or the second grating structure comprises a non-holographic diffractive optical element.

Additionally or alternatively, the second light coupling device (e.g., second light coupling device 1020) may comprise a second grating medium, a first grating structure within the second grating medium, the first grating structure being configured to reflect light of a wavelength about a first reflective axis offset from a surface normal of the second waveguide portion at a first incidence angle, and a second grating structure within the second grating medium, the second grating structure being configured to reflect light of the wavelength about a second reflective axis offset from the surface normal of the second waveguide portion at a second incidence angle different from the first incidence angle. In some cases, the first reflective axis may be substantially similar to the second reflective axis.

Additionally or alternatively, the first light coupling device may have a first grating medium, a first grating structure within the first grating medium. The first grating structure may be configured to reflect TIR light so that the TIR light remains as TIR light while it propagates within the waveguide. The first grating structure may be configured to reflect light of a wavelength about a first reflective axis oriented on a plane parallel to the parallel plane surfaces of the first layer at a first incidence angle, and a second grating structure within the first grating medium, the second grating structure being configured to reflect light of the wavelength about a second reflective axis substantially parallel to the first reflective axis at a second incidence angle different from the first incidence angle. For example, at least one of the first grating structure or the second grating structure may comprise a hologram.

Figure 11:
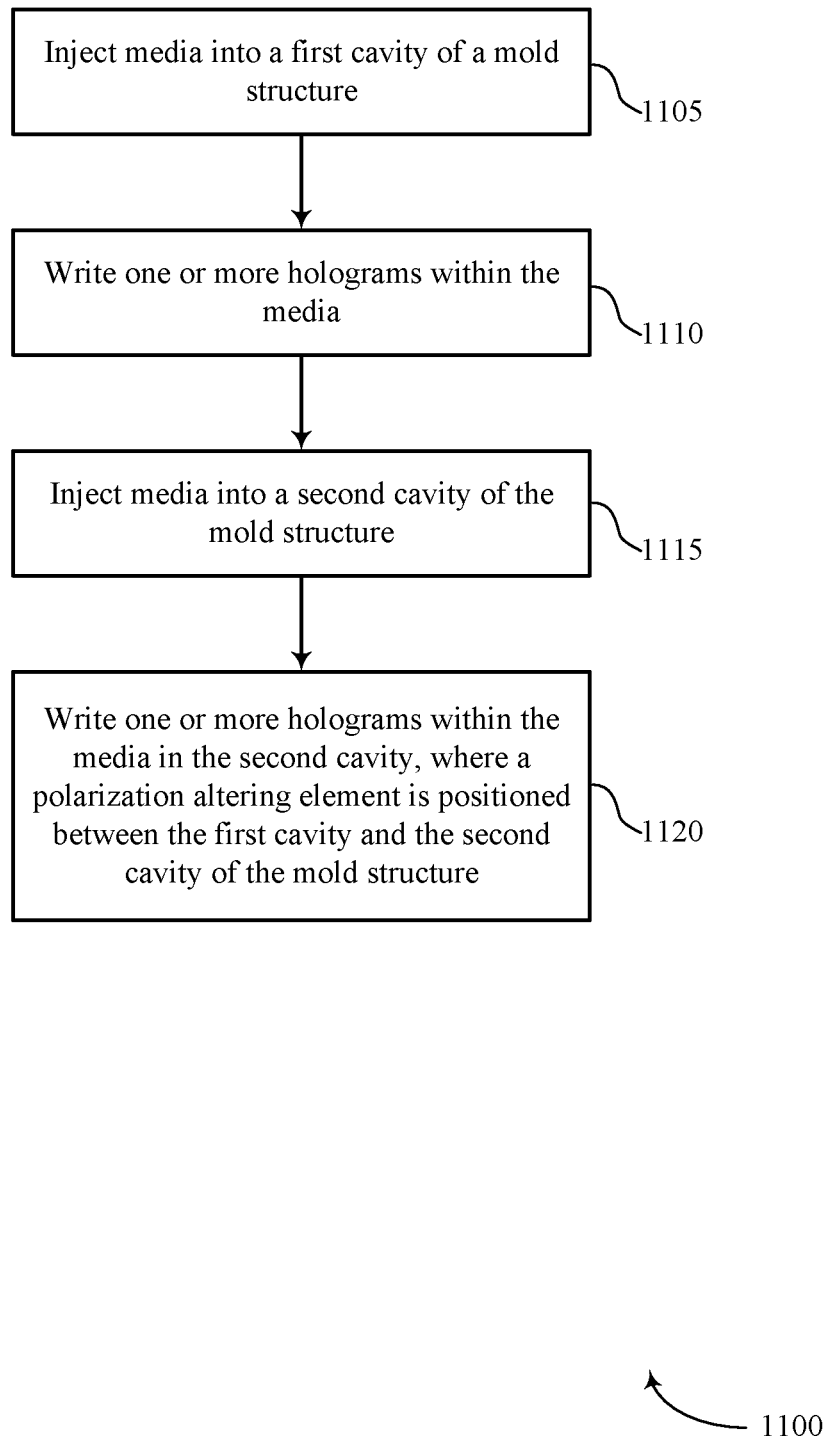
FIG. 11 illustrates a flowchart illustrating a method for making an optical device that includes polarization management of light in accordance with aspects of the present disclosure.

FIG. 11 illustrates a flowchart illustrating a method 1100 for making an optical device that includes polarization management of light in accordance with aspects of the present disclosure. For example, the operations of method 1100 may be performed to make a waveguide, optical device, or HMD device as described with reference to FIGS. 1 through 10.

At block 1105 holographic recording media may be injected into a first cavity of a mold structure. The operations of block 1105 may be performed according to the processes described herein.

At block 1110 a recording apparatus may write one or more holograms within the media in the first cavity. The operations of block 1110 may be performed according to the methods described herein. In certain examples, aspects of the operations of block 1110 may be performed by using two laser beams known as recording beams to write the one or more holograms. In some cases, the recording beams may be monochromatic collimated plane wave beams.

At block 1115 holographic recording media may be injected into a second cavity of the mold structure. The operations of block 1115 may be performed according to the methods described herein.

At block 1120 the recording apparatus may write one or more holograms within the media in the second cavity. A polarization altering element may be positioned between the first cavity and the second cavity of the mold structure (e.g., bisecting the two cavity portions). The operations of block 1120 may be performed according to the processes and techniques described herein.

Figure 12:
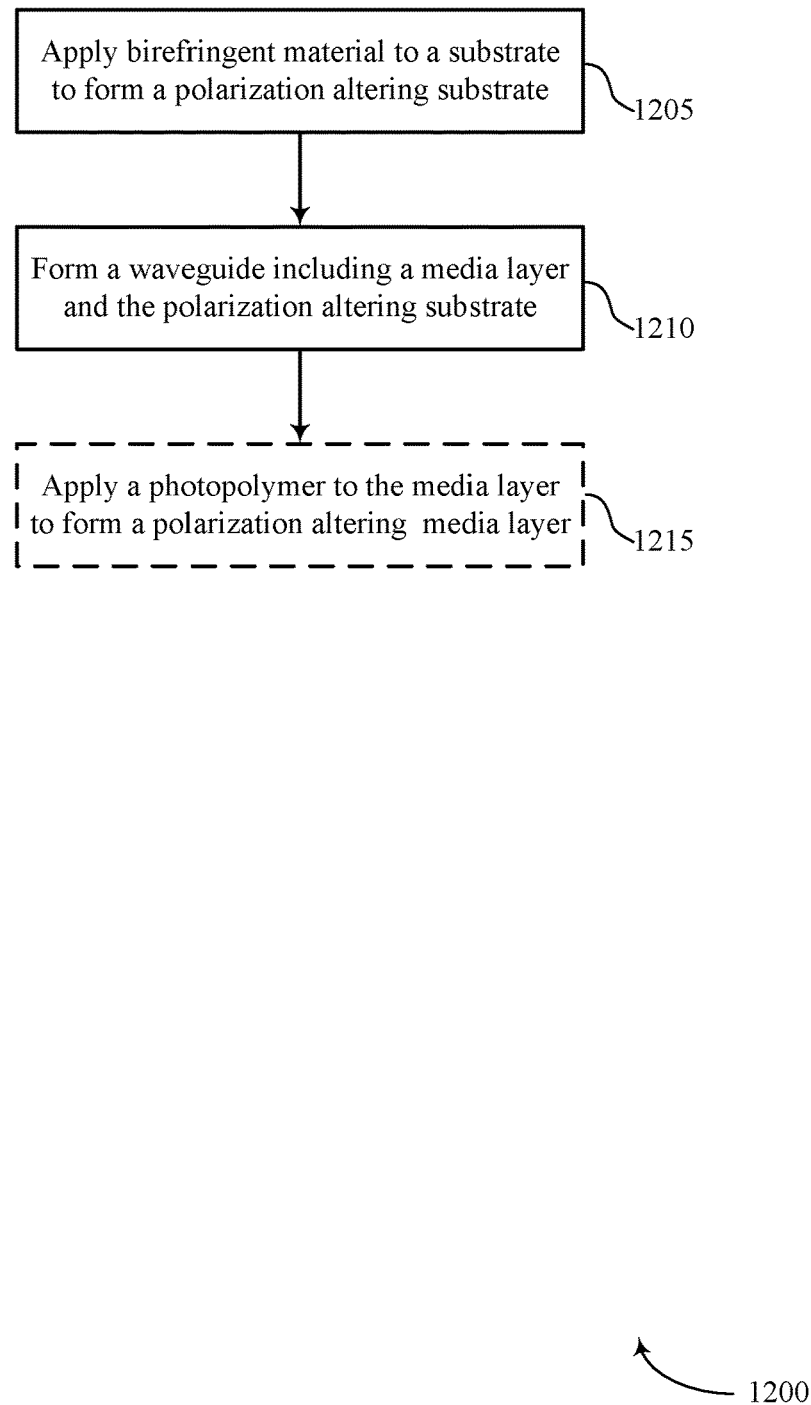
FIG. 12 illustrates a flowchart illustrating a method for making an optical device that includes polarization management of light in accordance with aspects of the present disclosure.

FIG. 12 illustrates a flowchart illustrating a method 1200 for making an optical device that includes polarization management of light in accordance with aspects of the present disclosure. For example, the operations of method 1200 may be performed to make a waveguide, optical device, or HMD device as described with reference to FIGS. 1 through 10.

At block 1205 birefringent material may be applied to a substrate to form a polarization altering substrate. In some cases, the birefringent material may apply to a surface of the substrate. In some cases, the birefringent material may be combines with material used to form the substrate. The operations of block 1205 may be performed according to the processes described herein.

At block 1210 a waveguide may be formed including a media layer and the polarization altering substrate. The operations of block 1210 may be performed according to the methods described herein. In certain examples, polarization altering elements and layers as illustrated in FIGS. 4A-C may be formed.

In one option, at block 1215 a photopolymer may be applied to the media layer to form a polarization altering media layer. For example, liquid crystals in a photopolymer may tend to align with the grating vectors of written holograms in the media layer thereby giving the photopolymer anisotropic properties and the anisotropy that leads to birefringence. The operations of block 1215 may be performed according to the methods described herein. In certain examples, polarization altering element within a medial layer as illustrated in FIG. 4D may be formed.

It should be noted that these methods describe possible implementation, and that the operations and the steps may be rearranged or otherwise modified such that other implementations are possible. In some examples, aspects from two or more of the methods may be combined. For example, aspects of each of the methods may include steps or aspects of the other methods, or other steps or techniques described herein. Thus, aspects of the disclosure may provide for further making waveguides, optical devices, or HMD devices as described with reference to FIGS. 1 through 10.

The description herein is provided to enable a person skilled in the art to make or use the disclosure. Various modifications to the disclosure will be readily apparent to those skilled in the art, and the generic principles defined herein may be applied to other variations without departing from the scope of the disclosure. Thus, the disclosure is not to be limited to the examples and designs described herein but is to be accorded the broadest scope consistent with the principles and novel features disclosed herein.

TERMINOLOGY

The term "approximately," refers to plus or minus 10% of the value given.

The term "reflective axis" refers to an axis that bisects an angle of incident light relative to its reflection. The absolute value of an angle of incidence of the incident light relative to the reflective axis is equal to the absolute value of the angle of reflection of the incident light's reflection, relative to the reflective axis. For conventional mirrors, the reflective axis is coincident with surface normal (i.e., the reflective axis is perpendicular to the mirror surface). Conversely, implementations of skew mirrors according to the present disclosure may have a reflective axis that differs from surface normal, or in some cases may have a reflective axis that is coincident with surface normal. Persons skilled in the art given the benefit of the present disclosure will recognize that a reflective axis angle can be determined by adding an angle of incidence to its respective angle of reflection, and dividing the resulting sum by two. Angles of incidence and angles of reflection can be determined empirically, with multiple measurements (generally three or more) used to generate a mean value.

The term "reflection" and similar terms are used in this disclosure in some cases where "diffraction" might ordinarily be considered an appropriate term. This use of "reflection" is consistent with mirror-like properties exhibited by skew mirrors and helps avoid potentially confusing terminology. For example, where a grating structure is said to be configured to "reflect" incident light, a conventional artisan might prefer to say the grating structure is configured to "diffract" incident light, since grating structures are generally thought to act on light by diffraction. However, such use of the term "diffract" would result in expressions such as "incident light is diffracted about substantially constant reflective axes," which could be confusing. Accordingly, where incident light is said to be "reflected" by a grating structure, persons of ordinary skill in art, given the benefit of this disclosure, will recognize that the grating structure is in fact "reflecting" the light by a diffractive mechanism. Such use of "reflect" is not without precedent in optics, as conventional dielectric mirrors are generally said to "reflect" light despite the predominant role diffraction plays in such reflection. Artisans of ordinary skill thus recognize that most "reflection" includes characteristics of diffraction, and "reflection" by a skew mirror or components thereof also includes diffraction.

The term "light" refers to electromagnetic radiation familiar to persons skilled in the art. Unless reference is made to a specific wavelength or range of wavelengths, such as "visible light", which refers to a part of the electromagnetic spectrum visible to the human eye, the electromagnetic radiation can have any wavelength.

The terms "hologram" and "holographic grating" refer to a recording of an interference pattern generated by interference between multiple intersecting light beams. In some examples, a hologram or holographic grating may be generated by interference between multiple intersecting light beams where each of the multiple intersecting light beams remains invariant for an exposure time. In other examples, a hologram or holographic grating may be generated by interference between multiple intersecting light beams where an angle of incidence of at least one of the multiple intersecting light beams upon the grating medium is varied while the hologram is being recorded, and/or where wavelengths are varied while the hologram is being recorded (e.g., a complex hologram or complex holographic grating).

The term "sinusoidal volume grating" refers to an optical component which has an optical property, such as refractive index, modulated with a substantially sinusoidal profile throughout a volumetric region. Each (simple/sinusoidal) grating corresponds to a single conjugate vector pair in k-space (or a substantially point-like conjugate pair distribution in k-space).

The term "eye box" refers to a two-dimensional area outlining a region wherein a human pupil may be placed for viewing the full field of view at a fixed distance from a grating structure.

The term "exit pupil" refers to a real or virtual aperture passing a beam of light, at its minimum size, emerging from imaging optics. In use, the imaging optics system is typically configured to direct the beam of light toward image capture means. Examples of image capture means include, but are not limited to, a user's eye, a camera, or other photodetector.

The term "grating medium" refers to a physical medium that is configured with a grating structure for reflecting light. A grating medium may include multiple grating structures.

The term "grating structure" refers to one or more gratings configured to reflect light. In some examples, a grating structure may include a set of gratings that share at least one common attribute or characteristic (e.g., a same wavelength of light to which each of the set of gratings is responsive). In some implementations, a grating structure may include one or more holograms. In other implementations, a grating structure may include one or more sinusoidal volume gratings. In some examples, the grating structures may be uniform with respect to a reflective axis for each of the one or more gratings (e.g., holograms or sinusoidal gratings). Alternatively or additionally, the grating structures may be uniform with respect to a length or volume for each of the one or more gratings (e.g., holograms or sinusoidal volume gratings) within the grating medium.

In the appended figures, similar components or features may have the same reference label. Further, various components of the same type may be distinguished by following the reference label by a dash and a second label that distinguishes among the similar components. If just the first reference label is used in the specification, the description is applicable to any one of the similar components having the same first reference label irrespective of the second reference label.

What is claimed is:

1. An optical device, comprising:
 a first waveguide portion including a first layer having parallel plane surfaces, the first waveguide portion having a first light coupling device;
 a second waveguide portion including a second layer having parallel plane surfaces, the second waveguide portion having a second light coupling device that comprises a hologram; and
 a polarization altering element operatively coupled to a light path associated with the first light coupling device and the second light coupling device.

2. The optical device of claim 1, wherein the polarization altering element is positioned between the first layer and the second layer.

3. The optical device of claim 1, further comprising:
 a third layer having parallel plane surfaces, the third layer positioned such that a surface of the parallel plane surfaces of the third layer contacts both a surface of the parallel plane surfaces of the first layer and a surface of the parallel plane surfaces of the second layer.

4. The optical device of claim 1, wherein the polarization altering element is positioned such that a surface of the polarization altering element contacts both an edge of the first layer and an edge of the second layer.

5. The optical device of claim 4, further comprising:
 a third light coupling device positioned to contact a surface of the polarization altering element different from the surface of the polarization altering element that contacts both the edge of the first layer and the edge of the second layer.

6. The optical device of claim 1, wherein the polarization altering element is positioned such that a surface of the polarization altering element contacts a surface of the first waveguide portion and an opposing surface of the polarization altering element contacts a surface of the second waveguide portion.

7. The optical device of claim 1, wherein the polarization altering element is a half-wave plate.

8. The optical device of claim 1, wherein the polarization altering element includes a light absorbing edge.

9. The optical device of claim 1, wherein the first light coupling device comprises:
 a first grating medium;
 a first grating structure within the first grating medium, the first grating structure being configured to reflect light of a wavelength about a first reflective axis offset from a surface normal of the parallel plane surfaces of the first layer at a first incidence angle; and
 a second grating structure within the first grating medium, the second grating structure being configured to reflect light of the wavelength about a second reflective axis substantially parallel to the first reflective axis at a second incidence angle different from the first incidence angle, the second reflective axis being substantially parallel to the first reflective axis.

10. The optical device of claim 9, wherein at least one of the first grating structure or the second grating structure comprises a hologram.

11. The optical device of claim 9, wherein at least one of the first grating structure or the second grating structure comprises a non-holographic diffractive optical element.

12. The optical device of claim 1, wherein the second light coupling device comprises:
 a second grating medium;
 a first grating structure within the second grating medium, the first grating structure being configured to reflect light of a wavelength about a first reflective axis offset from a surface normal of the second waveguide portion at a first incidence angle; and
 a second grating structure within the second grating medium, the second grating structure being configured to reflect light of the wavelength about a second reflective axis offset from the surface normal of the second waveguide portion at a second incidence angle different from the first incidence angle.

13. The optical device of claim 12, wherein the first reflective axis is substantially similar to the second reflective axis.

14. An optical device, comprising:
 a waveguide including a first layer having parallel plane surfaces and a second layer having parallel plane surfaces;
 a polarization altering element positioned between the first layer and the second layer; and
 a light coupling device disposed within the second layer, wherein the light coupling device comprises a grating medium and a grating structure in the grating medium.

15. An optical device, comprising:
 a waveguide including a first layer having parallel plane surfaces and a second layer having parallel plane surfaces;
 a first polarization altering element positioned between the first layer and the second layer;
 a light coupling device disposed within the second layer; and
 a second polarization altering element positioned on a surface of the first layer that is opposite to a surface of the first layer that contacts the first polarization altering element.

16. The optical device of claim 14, further comprising:
 an additional light coupling device disposed within the second layer, the additional light coupling device having a second reflective axis different from a first reflective axis of the light coupling device.

17. The optical device of claim 15, further comprising:
 a third polarization altering element disposed within the second layer.

18. The optical device of claim 14, wherein the grating structure is configured to reflect light of a wavelength about a first reflective axis oriented on a plane parallel to the parallel plane surfaces of the first layer at a first incidence angle, wherein the light coupling device further comprises an additional grating structure within the grating medium, the additional grating structure being configured to reflect light of the wavelength about a second reflective axis oriented on the plane parallel to the parallel plane surfaces of the first layer at a second incidence angle different from the first incidence angle.

19. The optical device of claim 18, wherein the grating structure comprises a hologram.

20. An optical device, comprising:
   a first waveguide portion including a diffraction grating and a first layer having parallel plane surfaces;
   a second waveguide portion including a second layer having parallel plane surfaces; and
   a polarization altering element operatively coupled to a light path associated with the first waveguide portion and the second waveguide portion.

* * * * *